United States Patent [19]
Turner

[11] Patent Number: 5,348,339
[45] Date of Patent: Sep. 20, 1994

[54] AIR BAG MODULE WITH COVER

[75] Inventor: Darin J. Turner, Warren, Mich.

[73] Assignee: AlliedSignal Inc., Morristown, N.J.

[21] Appl. No.: 996,231

[22] Filed: Dec. 23, 1992

Related U.S. Application Data

[63] Continuation-in-part of Ser. No. 968,751, Oct. 30, 1992.

[51] Int. Cl.⁵ .............................................. B60R 21/16
[52] U.S. Cl. .................. 280/728 B; 280/732
[58] Field of Search ........... 280/728 A, 728 B, 728 R, 280/730 R, 731, 732

[56] References Cited

U.S. PATENT DOCUMENTS

| | | | |
|---|---|---|---|
| 3,888,508 | 6/1975 | Kizu et al. | 280/731 |
| 4,893,833 | 1/1990 | DiSalvo et al. | 280/728 B |
| 4,989,897 | 2/1991 | Takada | 280/728 B |
| 5,167,427 | 12/1992 | Baba | 280/728 B |
| 5,201,541 | 4/1993 | Jones et al. | 280/731 |

FOREIGN PATENT DOCUMENTS 3545028  7/1987  Fed. Rep. of Germany ... 280/728 B Primary Examiner—Brian L. Johnson
Assistant Examiner—Paul Dickson
Attorney, Agent, or Firm—Markell Seitzman

[57] ABSTRACT

An air bag module (200) comprising: a housing (204) having an open top and a plurality of tabs (270) extending from an outer wall (102) proximate the open top, each tab including a slot (280); a deployment door (202) including a top portion (208) for enclosing the open top of the housing, a flange portion (220) engageable with the tabs and a hinge portion (210) securely fastened to the housing 204; the flange portion including openings (222) for receiving a corresponding one of the tabs, and a boss (290) that extends into each opening restricting a portion of each opening, such that upon full insertion of a tab within a corresponding opening the boss enters its slot (280) securing the flange portion to the housing and; a tear seams, formed on the door which when torn permits the door to rotate about the hinge portion (210).

4 Claims, 2 Drawing Sheets

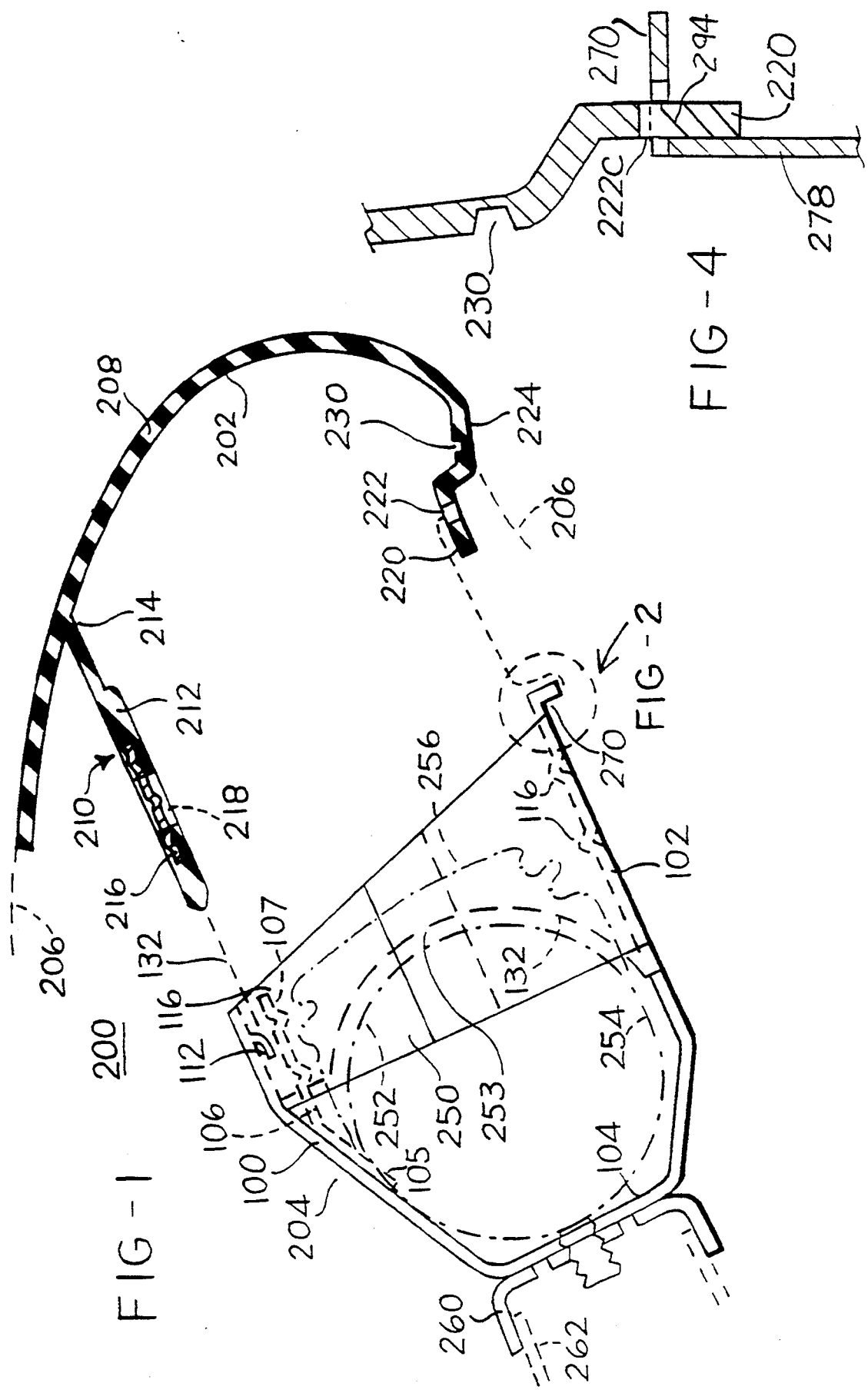

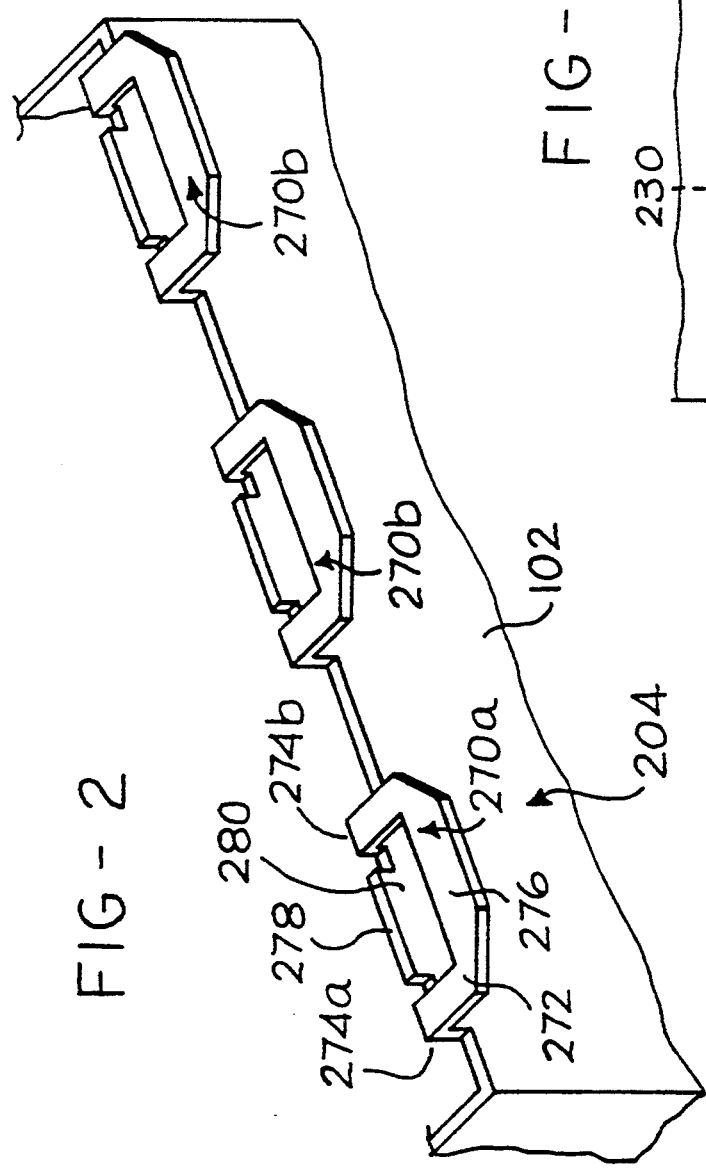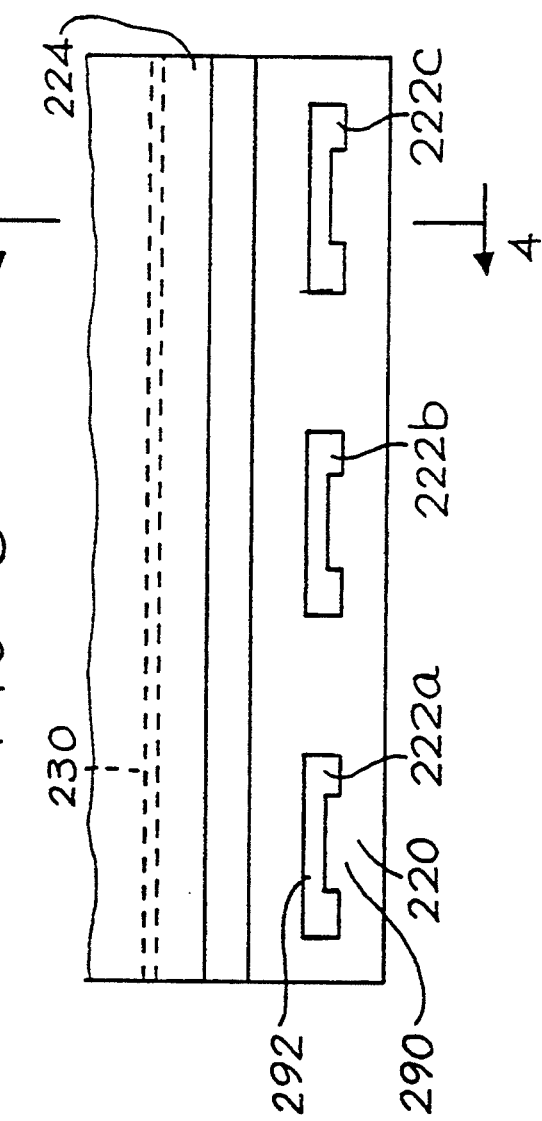

AIR BAG MODULE WITH COVER

This patent application is a continuation-in-part of Ser. No. 07/968,751, filed Oct. 30, 1992.

BACKGROUND AND SUMMARY OF THE INVENTION

The present invention generally relates to an air bag safety system and more specifically to a passenger side air bag system including a housing and a fastenerless deployment door devoid of bolts and rivets typically used to mount deployment doors to housings.

U.S. Pat. No. 4,893,833 illustrates a passenger side deployment door having a single, flexible hinge along one side and a frangible member along another side of the cover. The frangible member breaks apart in response to air bag deployment forces permitting the cover to rotate about the hinge. The hinge and frangible member are attached to cooperating structure by bolts or rivets, received through bolt/rivet holes which makes the assembly process more complicated than necessary. In addition, the bolt holes provide a source of increased stress.

It is an object of the present invention to provide an improved passenger side air bag deployment door and housing. Accordingly, the invention comprises: an air bag module comprising: a housing having an open top and a plurality of tabs extending from an outer wall proximate the open top, each tab including a slot; a deployment door including a top portion for enclosing the open top of the housing, a flange portion engageable with the tabs and a hinge portion securely fastened to the housing; the flange portion including openings for receiving a corresponding one of the tabs, and a boss that extends into each opening restricting a portion of each opening, such that upon full insertion of a tab within a corresponding opening the boss enters it s slot securing the flange portion to the housing and; tear seams, formed on the door which when torn permits the door to rotate about the hinge portion.

Many other objects and purposes of the invention will be clear from the following detailed description of the drawings.

BRIEF DESCRIPTION OF THE DRAWINGS

In the drawings:

FIG. 1 illustrates a partial assembly drawing of the present invention showing a housing or canister and an air bag deployment door.

FIG. 2 illustrates a partial orthogonal view illustrating a plurality of tabs formed on a housing.

FIG. 3 is a front plan view of a deployment door.

FIG. 4 is a partial cross-sectional view showing the attachment of the door to its housing.

DETAILED DESCRIPTION OF THE DRAWINGS

With reference to FIG. 1 there is shown an air bag assembly or module 200 comprising a deployment door or cover 202 and a housing or canister 204. The door 202 is sized to fit within an opening within an instrument panel portion of the vehicle. The instrument panel is generally shown by the phantom line 206. The deployment door 202 is preferably manufactured of a thermoplastic material and includes a top shell 208 which is shaped to conform to the adjacent portions of the instrument panel 206. Extending from the top 208 is a hinge portion generally shown as 210 comprising a hinge flange 212. The intersection of the hinge flange to the top 208 defines a flexible hinge 214 about which the deployment door 202 may rotate. As illustrated, the thickness of the flange 212 in the vicinity of the hinge 214 is reduced in thickness to facilitate the rotation. The hinge flange 212 is preferably injection molded about a rectangularly shaped metal reinforcement 216 which extends along the width (out of the plan of the paper) of the hinge flange 212. The reinforcement 216 includes a plurality of openings 218, typically three, only one of which is shown in FIG. 1. These openings are aligned with openings formed in the hinge flange 212. The deployment door 202 additionally includes a connection flange 220 comprising a plurality of openings 222. The flange 220 extends inwardly relative to a lower portion 224 of the deployment door. Situated in the flange 220, above openings 222 or within the lower portion of the deployment door 224 is a reduced thickness region generally shown as 230 which preferably extends across the width of the deployment door. This reduced thickness region defines a tear seam along which the deployment door will rip or tear upon deployment of an air bag thereby permitting the deployment door 202 to rotate about the hinge 214 and move away from the inflating air bag.

As mentioned above, the assembly or module 200 includes the housing 204. The housing comprises a generally U-shaped structure which includes an open top and additionally includes a first outer wall 100 and an oppositely positioned second outer wall 102 joined by a bottom 104. Welded inside the wall 100 at location 105 is a flexible wall or liner 106. The tip 107 of wall 106 defines a space 132 relative to wall 100. Wall 106 may include a plurality of grooves to enhance its rigidity. This is also true of wall 102. A portion of wall 100 is cut and bent inwardly defining a tab 112. The number of tabs 112 corresponds to the number of openings 218 in the metal reinforcement 216. The housing additionally includes side walls 250 and 252 which extend inwardly from respective ends of the walls 100 and 102. As shown in FIG. 1, the side wall 250 comprises two overlapping flaps that may integrally extend from corresponding outer walls 100 and 102. As shown in FIG. 1, the side wall 250 only partially covers a corresponding side of the housing 204 however, the side wall 250 can be constructed to completely enclose such side. The side wall 252 is fabricated to provide an opening 253 to receive a cylindrically shaped gas generator (shown in phantom line) as is known in the art. The housing 204 also protects an air bag 256 (also shown in phantom line) in its predeployed or folded state. As is known in the art, the air bag may be disposed about a thin cylindrical member often called a retainer into which is placed the gas generator 254. One such construction is shown in the commonly assigned U.S. Pat. No. 5,062,664. A fastener extends from the retainer or alternatively from the gas generator through an opening in the bottom 104 of the housing. The housing 204 may include a bracket 260 for attachment of the housing to a cooperating structural member 262 of the vehicle located below the instrument panel 206. The side 102 of housing 204 includes a plurality of tabs 270, only one of which is shown in FIG. 3. The tabs enter a corresponding opening 222 formed in the cover. During installation, the hinge flange 212 is inserted within space 132 and pushed downwardly such that the tabs 112 enter the openings 218 providing a secure snap fit therebetween.

The flexible deployment door 202 is pulled outwardly so that the flange 220 over travels the tabs 270. The door 202 is released permitting the tabs 270 to enter into the corresponding opening 222.

With reference to FIG. 2 there is shown a partial orthogonal view of the housing. Each tab 270a–270c includes a three-sided member 272 which extends outwardly from wall 102. Each tab 270a–c is an integral part of wall 102 which has been bent over at locations 274a and 274b. A center portion 276 of each tab 270a–c is spaced from an extending portion 278 of wall 102. This spacing or slot is shown by numeral 280.

FIG. 3 illustrates a plan view of the end portion 224 of the deployment door 202. Shown in this figure are three openings 222a–222c. Each of the openings includes a flexible boss such as 290 that narrows a center portion 292 of each opening 222a–c. The spacing of the narrowed opening 292 may be slightly smaller than the width of the tab 270a–c. Each boss 290 on a rear surface thereof, i.e., facing the side 102 of the housing may be sloped or chamfered at 294 to provide a means for guiding a respective tab 270 into its corresponding opening 222. FIG. 4 also shows one of the tabs such as 270c fitted through its corresponding opening. Upon insertion of the tab 270 into its opening 222 the boss 290, if flexible, will be bent over and upon full insertion of the tab in its opening, the boss will return to its undeflected position and reside in the slot 280.

Many changes and modifications in the above described embodiment of the invention can, of course, be carried out without departing from the scope thereof. Accordingly, that scope is intended to be limited only by the scope of the appended claims.

I claim:

1. An air bag module (200) comprising:

a housing (204) having an open top and a plurality of tabs (270) extending from an outer wall (102) proximate the open top, each tab including a bent over three sided member (272) formed of part of the outer wall (102), including a first and a second part extending from the outer wall and a center member (272) joining the first and second part, the first second part and center member defining a slot (280) with the center member spaced from the outer wall.

a deployment door (202) including a top portion (208) for enclosing the open top of the housing, a flange portion (220) engageable with the tabs and a hinge portion (210) securely fastened to the housing 204;

the flange portion including openings (222) for receiving a corresponding one of the tabs, and a boss (290) that extends into each opening narrowing a portion of each opening, such that upon full insertion of a tab within a corresponding narrowed portion of each opening the boss is positioned with a corresponding slot (280) securing the flange portion to the housing and;

tear seam means (230), formed on the top of the door which when torn, upon inflation of an air bag, permit portions of the top to rotate about the hinge portion (210).

2. The apparatus as defined in claim 1 wherein the boss is flexible and deflected by a corresponding center member as the tab is inserted in the narrowed portion of the opening, the boss returning to an undeflected position within a slot upon full insertion of the tab.

3. The apparatus as defined in claim 1 wherein each boss, on a surface thereof facing the housing, is sloped or chamfered to provide a means for guiding a center member into its corresponding opening.

4. The apparatus as defined in claim 1 wherein the top portion of the cover is arcuately shaped and wherein the cover is flexible such that upon securement of the hinge portion to the housing, the cover is extendable in front of the tabs prior to insertion and upon release of the cover the tabs enter the openings in the flange portion.

* * * * *